US010290124B2

(12) United States Patent
Steward

(10) Patent No.: US 10,290,124 B2
(45) Date of Patent: May 14, 2019

(54) SONAR DEPTH DISPLAY

(71) Applicant: NAVICO HOLDING AS, Egersund (NO)

(72) Inventor: Lucas Dale Steward, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 361 days.

(21) Appl. No.: 14/049,364

(22) Filed: Oct. 9, 2013

(65) Prior Publication Data

US 2015/0097838 A1 Apr. 9, 2015

(51) Int. Cl.
*G06T 11/20* (2006.01)
*G01S 7/00* (2006.01)
*G01S 7/62* (2006.01)
*G01S 15/89* (2006.01)

(52) U.S. Cl.
CPC ............ *G06T 11/206* (2013.01); *G01S 7/003* (2013.01); *G01S 7/629* (2013.01); *G01S 7/6281* (2013.01); *G01S 15/89* (2013.01)

(58) Field of Classification Search
CPC ..... G06T 11/206; G06T 15/005; G01S 15/88; G01S 15/8902; G01S 15/02; G01S 15/12; G01S 15/89; G01S 15/931; G01S 1/72; G01S 15/96; G01S 7/6263; G01S 7/60; G01S 11/14; H04B 11/00; B60T 8/172; B60W 20/00; G05D 1/0272; G07C 5/008
USPC ....... 345/418, 419, 440, 440.1, 530; 367/87, 367/88, 92, 95, 99, 107, 108, 110, 115, 367/117, 118, 131, 141; 701/1, 21, 23, 701/24, 25, 26, 28, 32.3, 32.4
See application file for complete search history.

(56) References Cited

U.S. PATENT DOCUMENTS 3,187,704 A 6/1965 Shatto, Jr.
3,795,893 A 3/1974 Kritz et al.
3,893,076 A 7/1975 Clifford
(Continued)

FOREIGN PATENT DOCUMENTS

EP 2602639 A1 6/2013
JP 2006-0647700 2/2006

OTHER PUBLICATIONS

Owners Manual for GARMIN GPSMAP® 431, 400/500 series, available at: https://support.garmin.com/support/manuals/manuals.faces?partNo=010-00765-00&cID=148&pID=28752 , pp. i-iv; and 1-88, (copyright 2010; most recent revision date: Mar. 2012) (last visited Nov. 16, 2015).*

(Continued)

*Primary Examiner* — Sarah Lhymn
(74) *Attorney, Agent, or Firm* — Nelson Mullins Riley & Scarborough LLP

(57) ABSTRACT

Various implementations described herein are directed to a marine electronics device used to display marine sonar data. The marine electronics device may include a computer system with a processor, memory, and a display. The memory may have a plurality of executable instructions. When the executable instructions are executed by the processor, the processor may receive depth information determined using a sonar device disposed underneath a vessel and configured to acquire sonar data in the direction of travel of the vessel. The processor may then cause the received depth information to be displayed on a navigation chart.

4 Claims, 6 Drawing Sheets

(56) References Cited

U.S. PATENT DOCUMENTS

| | | | |
|---|---|---|---|
| 4,312,053 A | 1/1982 | Lipsky | |
| 4,829,493 A | 5/1989 | Bailey | |
| 4,879,697 A | 11/1989 | Lowrance et al. | |
| 4,939,661 A * | 7/1990 | Barker | G01C 21/22 342/452 |
| 5,025,423 A | 6/1991 | Earp | |
| 5,122,990 A | 6/1992 | Deines et al. | |
| 5,184,330 A | 2/1993 | Adams et al. | |
| 5,191,341 A | 3/1993 | Gouard et al. | |
| 5,537,380 A | 7/1996 | Sprankle, Jr. et al. | |
| 5,675,552 A | 10/1997 | Hicks et al. | |
| 6,185,505 B1 * | 2/2001 | Kelmenson | G01C 21/165 367/118 |
| 6,201,767 B1 | 3/2001 | Lagace et al. | |
| 6,225,984 B1 | 5/2001 | Crawford | |
| 6,321,158 B1 | 11/2001 | DeLorme et al. | |
| 6,411,283 B1 | 6/2002 | Murphy | |
| 6,418,080 B2 | 7/2002 | Inouchi | |
| 6,421,299 B1 | 7/2002 | Betts et al. | |
| 6,761,692 B2 | 7/2004 | Angelsen et al. | |
| 6,816,782 B1 | 11/2004 | Walters et al. | |
| 7,002,579 B2 | 2/2006 | Olson | |
| 7,035,166 B2 | 4/2006 | Zimmerman et al. | |
| 7,113,449 B2 | 9/2006 | Fairbairn | |
| 7,236,426 B2 | 6/2007 | Turner et al. | |
| 7,366,056 B2 | 4/2008 | Frivik | |
| 7,430,461 B1 | 9/2008 | Michaels | |
| 7,542,376 B1 * | 6/2009 | Thompson et al. | 367/104 |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 8,300,499 B2 | 10/2012 | Coleman et al. | |
| 8,305,840 B2 | 11/2012 | Maguire | |
| 8,717,847 B2 | 5/2014 | Blake | |
| 8,949,096 B2 | 2/2015 | Jolliff | |
| 2002/0035574 A1 | 3/2002 | Dumas | |
| 2002/0093541 A1 | 7/2002 | Schileru-Key | |
| 2004/0193364 A1 | 9/2004 | Chojnacki | |
| 2005/0007880 A1 | 1/2005 | Zimmerman et al. | |
| 2005/0099887 A1 * | 5/2005 | Zimmerman | G01S 7/52003 367/12 |
| 2005/0102101 A1 | 5/2005 | Beesley et al. | |
| 2006/0002235 A1 | 1/2006 | Knowles et al. | |
| 2006/0013066 A1 | 1/2006 | Nishimori et al. | |
| 2006/0119585 A1 | 6/2006 | Skinner | |
| 2006/0224940 A1 | 10/2006 | Lee | |
| 2007/0159922 A1 | 7/2007 | Zimmerman et al. | |
| 2007/0291589 A1 * | 12/2007 | Kawabata et al. | 367/88 |
| 2008/0008042 A1 | 1/2008 | Frivik et al. | |
| 2008/0080317 A1 * | 4/2008 | Inouchi | G01S 7/539 367/112 |
| 2008/0126935 A1 | 5/2008 | Blomgren | |
| 2008/0192575 A1 * | 8/2008 | Coleman | 367/115 |
| 2008/0204424 A1 | 8/2008 | Jin et al. | |
| 2009/0064055 A1 | 3/2009 | Chaudhri et al. | |
| 2009/0099871 A1 | 4/2009 | Gadodia | |
| 2009/0147623 A1 * | 6/2009 | Betts et al. | 367/88 |
| 2009/0179789 A1 | 7/2009 | Haughay, Jr. et al. | |
| 2009/0249247 A1 | 10/2009 | Tseng et al. | |
| 2009/0287409 A1 | 11/2009 | Summers | |
| 2010/0080082 A1 | 4/2010 | Betts et al. | |
| 2010/0142324 A1 | 6/2010 | Vogt | |
| 2010/0145601 A1 | 6/2010 | Kurtti et al. | |
| 2010/0157736 A1 * | 6/2010 | Riordan et al. | 367/88 |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2010/0302908 A1 | 12/2010 | Strong | |
| 2011/0013484 A1 | 1/2011 | Coleman et al. | |
| 2011/0013485 A1 | 1/2011 | Maguire | |
| 2011/0019887 A1 | 1/2011 | Roehrig et al. | |
| 2011/0025720 A1 | 2/2011 | Jo et al. | |
| 2011/0054784 A1 | 3/2011 | Wood et al. | |
| 2011/0154183 A1 | 6/2011 | Burns et al. | |
| 2012/0001773 A1 | 1/2012 | Lyons et al. | |
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0163126 A1 | 6/2012 | Campbell et al. | |
| 2012/0185801 A1 | 7/2012 | Madonna et al. | |
| 2012/0281507 A1 | 11/2012 | Rikoski | |
| 2013/0007665 A1 | 1/2013 | Chaudhri et al. | |
| 2013/0044569 A1 | 2/2013 | DePasqua | |
| 2013/0208568 A1 | 8/2013 | Coleman | |
| 2013/0242700 A1 | 9/2013 | Blake | |
| 2014/0010048 A1 | 1/2014 | Proctor | |
| 2014/0010049 A1 | 1/2014 | Proctor | |
| 2014/0210256 A1 | 2/2014 | Raats et al. | |
| 2014/0216325 A1 | 8/2014 | Hardy | |
| 2014/0269163 A1 | 9/2014 | Proctor | |
| 2014/0269192 A1 | 9/2014 | Proctor | |
| 2015/0085602 A1 | 3/2015 | Lebedev et al. | |
| 2015/0097838 A1 | 4/2015 | Steward | |

OTHER PUBLICATIONS

Weverka, P. (2011), "Powerpoint 2007 All-In-One Desk Reference for Dummies", John Wiley & Sons, pp. 241-286.*

SIMRAD: NSS Operator Manual (2011), available at: http://www.simrad-yachting.com/Root/User%20Guides/NSS_OM_EN_988-10102-002_w.pdf) (pp. 1-93).*

PCT International Search Report and Written Opinion; PCT/IB2013/060285; dated Feb. 18, 2014.

PCT International Search Report and Written Opinion; PCT/US2013/047869; dated Oct. 21, 2013.

PCT International Search Report and Written Opinion; PCT/US2013/048177; dated Oct. 21, 2013.

PCT International Search Report and Written Opinion; PCT/US2013/048129; dated Oct. 17, 2013.

PCT International Search Report and Written Opinion; PCT/US2013/047926; dated Oct. 11, 2013.

PCT International Search Report and Written Opinion; PCT/US2013/047645; dated Sep. 27, 2013.

PCT International Search Report and Written Opinion; PCT/IB2014/065158; dated Feb. 10, 2015.

International Search Report and Written Opinion for PCT/IB2015/055301 dated Dec. 4, 2015.

International Search Report and Written Opinion for PCT/US2013/048177; dated Oct. 21, 2013.

International Search Report and Written Opinion for PCT/US2013/048129 dated Oct. 17, 2013.

U.S. Appl. No. 14/689,764, filed Apr. 17, 2015, entitled "Sonar Transducer Assembly".

Zhang et al.; *3D Reconstruction of seabed surface through sonar data of AUV's*; Indian Journal of Geo-Marine Sciences; pp. 509-515; Dec. 2012; vol. 41(6).

* cited by examiner

SONAR DEPTH DISPLAY

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Sonar has been used to detect waterborne or underwater objects. For example, sonar devices may be used to determine depth and bottom topography, detect fish or other waterborne contacts, or locate wreckage. Devices such as transducer elements, or transducers, have been developed to produce sound at a particular frequency. These transducer elements may transmit the sound into and through the water, and they may also detect echo returns from sound that return to the transducer elements after reflecting off of an object.

Transducer elements may convert an electrical signal into sound energy and, conversely, may convert sound energy, detected via pressure changes, into an electrical signal. In operation, a transducer element may produce a sound pressure signal which emanates in a beam pattern such that a pressure wave is generated, where the pressure wave expands as it moves away from the source. Reflected sound may then return to the transducer element in the form of a sonar return signal, where the sonar return signal may be interpreted as a surface of an object. Such transducer elements may be directed in various directions from surface or submersible vessels to locate other vessels, or the transducer elements may be directed towards the seabed for navigation and/or target location. Display technology may also be utilized in the interpretation of sonar data representing the sonar return signals, such as through liquid crystal displays (LCDs) or other digital displays.

SUMMARY

Described herein are implementations of various technologies for a method for analyzing sonar data to determine depth information. In one implementation, a non-transitory computer-readable medium having stored thereon computer-executable instructions which, when executed by a computer, cause the computer to perform various actions. The actions may include receiving information pertaining to a location and receiving marine sonar data from a sonar device disposed underneath a vessel and configured to acquire sonar data in the direction of travel of the vessel. The received marine sonar data may be analyzed to determine the depth of the received location. The depth of the received location may be transmitted for display.

Described herein are also implementations of various technologies for a method for analyzing sonar data to determine and select depth information. In one implementation, a non-transitory computer-readable medium having stored thereon computer-executable instructions which, when executed by a computer, cause the computer to perform various actions. The actions may include receiving marine sonar data from a sonar device disposed underneath a vessel and configured to acquire sonar data in the direction of travel of the vessel. The received marine sonar data may be analyzed to determine the depth of a first location and a second location. The difference between the depth of the first location and that of the second location may be determined. The depth of the first or second location may be selected as the depth of the second location based on the difference between the depths. The selected depth may be transmitted for display.

Described herein are also implementations of various technologies for an apparatus for displaying marine electronic navigation data. The apparatus includes one or more processors, a display, and memory. The memory has a plurality of executable instructions. When the executable instructions are executed by the one or more processors, the one or more processors may receive depth information determined using marine sonar data from a sonar device disposed underneath a vessel and configured to acquire sonar data in the direction of travel of the vessel. The received depth information may then be displayed on a navigation chart.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
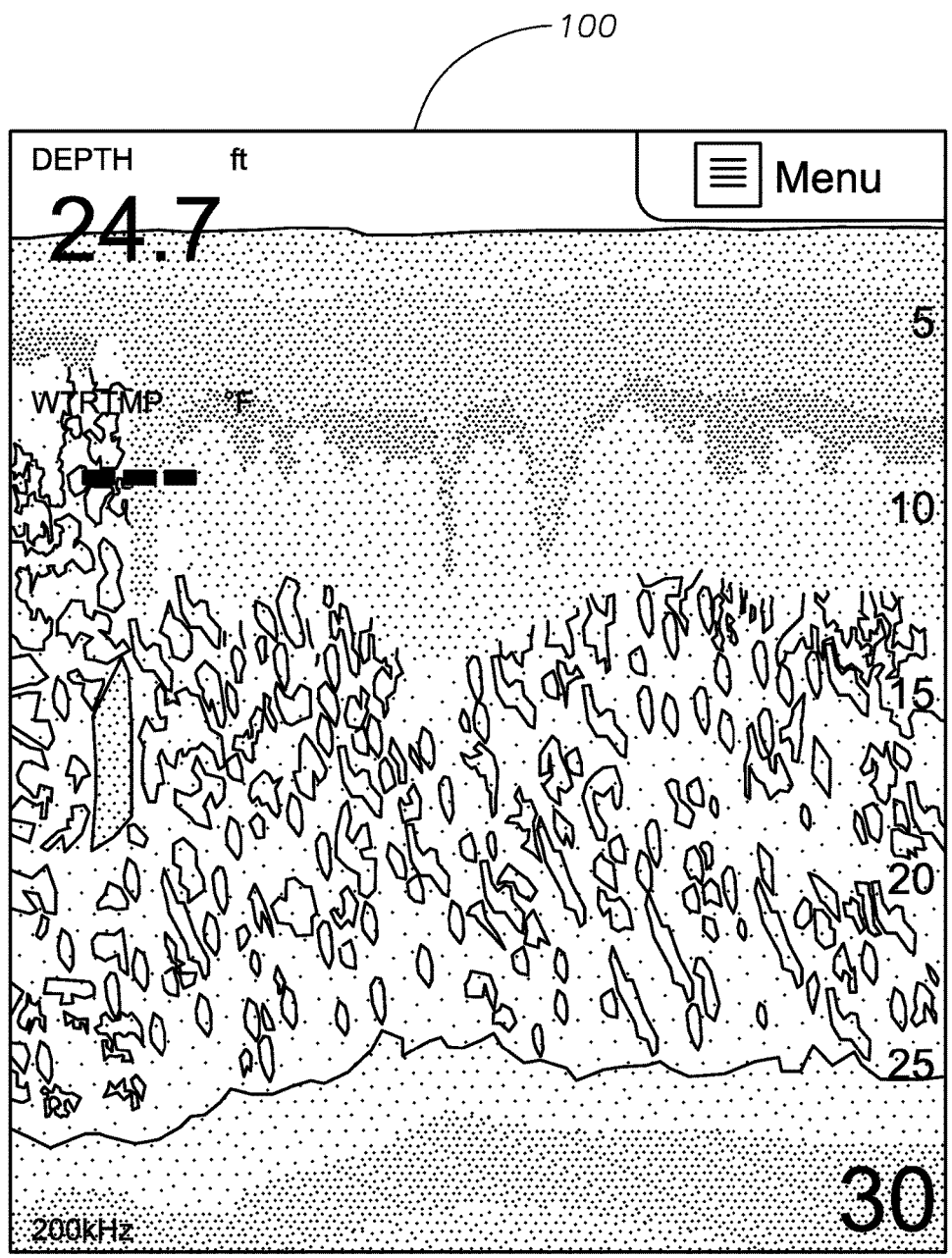
FIG. 1 illustrates sonar data in accordance with various implementations described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations of a forward looking sonar depth display are described herein will now be described in more detail with reference to FIGS. 1-7.

Figure 2:
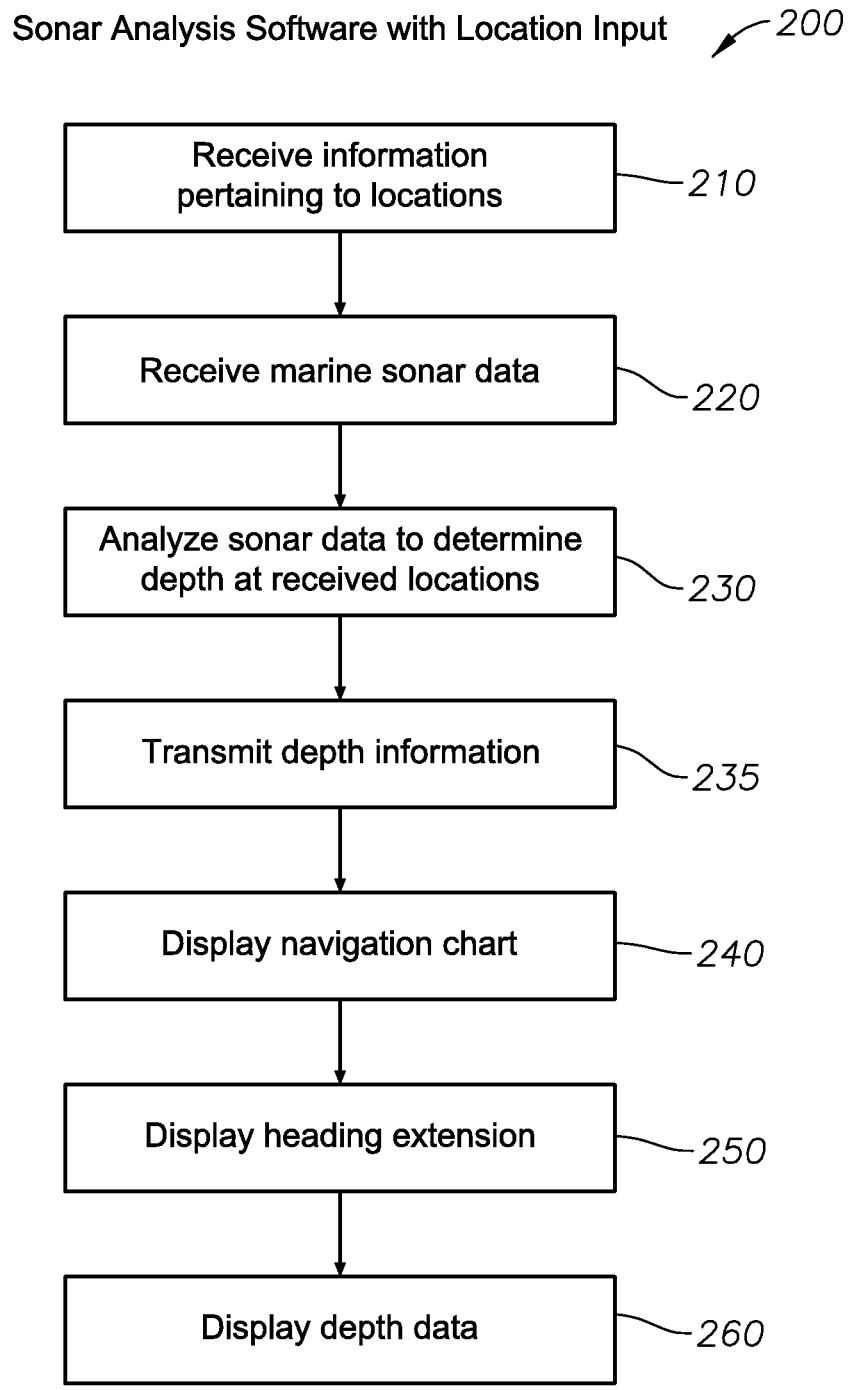
FIG. 2 is a flow diagram of a method for displaying depth information based on sonar data in accordance with implementations of various techniques described herein.

FIG. 2 illustrates a flow diagram of a method 200 for displaying depth information in accordance with implementations of various techniques described herein. In one implementation, method 200 may be performed by any computing device, such as computer 600, described below. It should be understood that while method 200 indicates a particular order of execution of operations, in some implementations, certain portions of the operations may be executed in a different order. Further, in some implementations, additional operations or steps may be added to method 200. Likewise, some operations or steps may be omitted. Additionally, the operations may be executed on more than one computer 600. For instance, blocks 210, 220, 230, and 235 may be executed on a first computer 600, while blocks 240, 250, and 260 may be executed on a second computer 600 or another device capable of displaying data.

As mentioned above, the computer 600 may be loaded with a set of instructions (software) to perform method 200. At block 210, the software may receive information pertaining to at least one location at which the depth will be determined. In one implementation, the user may provide a distance, and the depth will be determined at each location separated by that distance, e.g., if the user provided the distance one meter, then the depth would be determined every one meter. In another implementation, the user may provide a specific location at which the depth should be determined. The location may be transmitted as latitude and longitude coordinates, or in the form of a distance from the sonar device.

At block 220, the software may receive marine sonar data 100 from a sonar device disposed underneath a vessel and configured to acquire sonar data in the direction of travel of the vessel. The sonar device is described in more detail with reference to FIG. 5.

At block 230, the software may analyze the marine sonar data 100 to determine the depth of each received location. Although method 200 is described herein with reference to marine sonar data, it should be understood that in some implementations other types of marine data, e.g., nautical charts, may be used to determine the depths.

At block 235, the software may transmit the depth information for display. In one implementation, the software may transmit the depth information to a display device, or another computer, e.g., a marine electronics device 700, described in FIG. 7. In another implementation, the software may store the depth information in memory.

Figure 4:
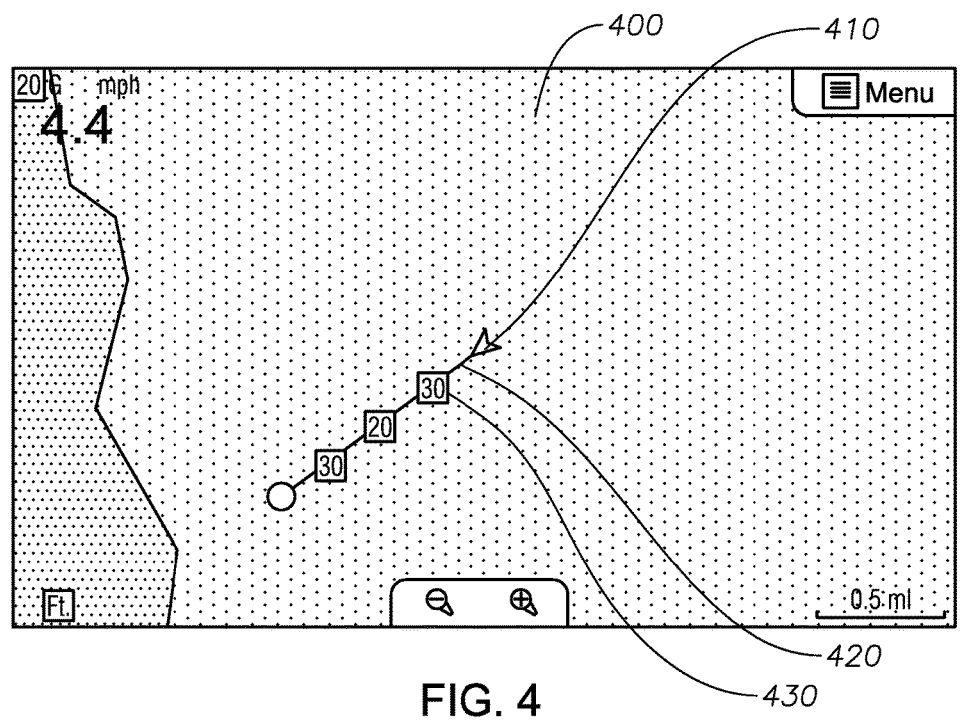
FIG. 4 illustrates a navigation chart with a heading line extension and depth information in accordance with implementations of various techniques described herein.

At block 240, the software may display the depth information on a navigation chart 400, as shown in FIG. 4. The navigation chart 400 may be a map of the current location of the vessel. The navigation chart 400 may include a representation of the vessel 410. The navigation chart 400 may include other information, including prior recorded depths, contours, navigational hazards, or any other information. The navigation chart 400 may also display a line 420 in the direction of travel of the vessel 410. This line may be commonly referred to as a heading line extension. The line 420 may be used to indicate the future location of the vessel if the vessel maintains the current course.

In one implementation, the depth information 430 may be displayed on the heading line extension 420. For example, the depth information 430 may be displayed as numerical values 430 on the heading line extension 420. In another implementation, the depth information 430 may be displayed as different colors on the heading line extension 420 to indicate different depths at different locations.

The navigation chart 400, heading line extension 420, and depth information 430 may be displayed on a marine electronics device 700, or on any other type of display.

Figure 3:
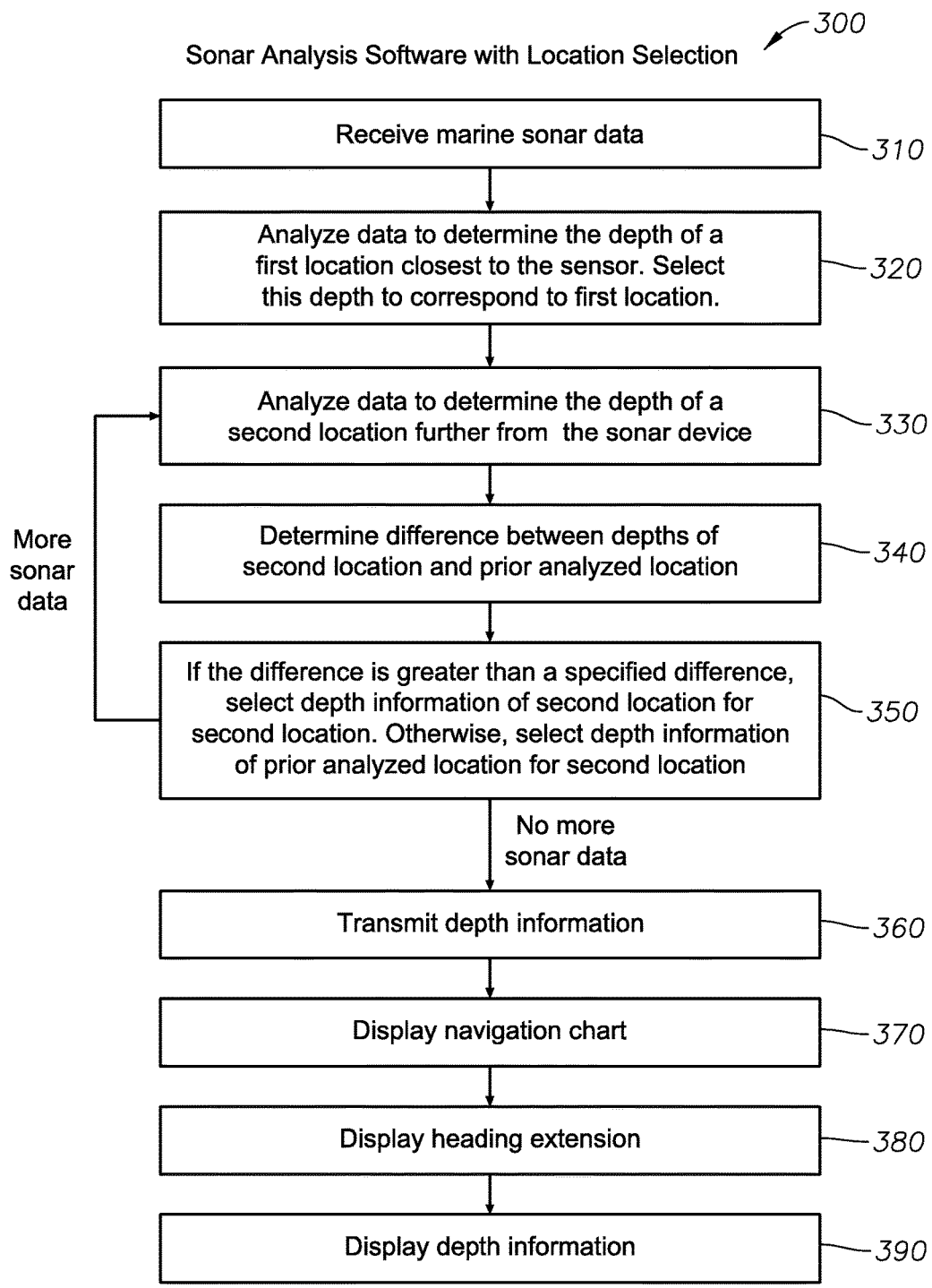
FIG. 3 is a flow diagram of a method for displaying depth information based on sonar data in accordance with implementations of various techniques described herein.

FIG. 3 illustrates a flow diagram of a method 300 for displaying depth information in accordance with implementations of various techniques described herein. In one implementation, method 300 may be performed by any computing device, such as computer 600, described below. It should be understood that while method 300 indicates a particular order of execution of operations, in some implementations, certain portions of the operations might be executed in a different order. Further, in some implementations, additional operations or steps may be added to method 300. Likewise, some operations or steps may be omitted. Additionally, the operations may be executed on more than one computer 600. For instance, blocks 310, 320, 330, 340, 350, and 360 may be executed on a first computer 600, and blocks 370, 380, and 390 may be executed on a second computer 600 or another device capable of displaying data.

As mentioned above, the computer 600 may be loaded with a set of instructions (software) to perform method 300. At block 310, the software may receive marine sonar data 100 from a sonar device disposed underneath a vessel and configured to acquire sonar data in the direction of travel of the vessel. The sonar device is described in more detail with reference to FIG. 5

At block 320, the software may analyze the marine sonar data 100 to determine the depth of a first location nearest to the sonar device. The software may then select this depth information to correspond to the first location.

At block 330, the software may analyze the marine sonar data 100 to determine the depth of a second location further from the sonar device than the prior analyzed location. As such, the prior analyzed location may be disposed between the sonar device and the second location. In one implementation, the second location may be disposed at a specified distance from the prior analyzed location.

At block 340, the software may determine the difference between the depth of the second location and the depth selected to correspond to the prior analyzed location. If the difference is greater than a specified/predetermined amount, then the depth information of the second location may be selected as the depth for the second location (block 350). However, if the difference is less than the specified/predetermined amount, then the depth information of the prior analyzed location is selected as the depth for the second location. If the software has not analyzed the furthest location from the sonar device available in the marine sonar data, then the software may return to block 330. Otherwise, if there is no remaining marine sonar data to analyze, the software may continue to block 360.

At block 360, the software may transmit the depth information for display. The depth information includes all the selected depths for the various locations. In one implementation, the software may transmit the depth information to a display device, or another computer, e.g., marine electronics device 700, described in FIG. 7. In another implementation, the software may store the depth information in memory.

At block 370, the software may then display the depth information on a navigation chart. Steps 370-390 are similar to steps 240-260 and as such, the details of steps 370-390 are provided with reference to steps 240-260.

It should be understood by one of ordinary skill in the art that method 300 may use other algorithms to determine which depths corresponding to which locations will be selected for display. In one implementation, the method 300 may determine the average depth for a series of specified ranges of locations and display those average depths. In another implementation, method 300 may determine the average depths and then display the depth only if the depth is a specified difference from the prior displayed depth. In a further implementation, method 300 may display all locations in which the depth is less than a specified depth.

Figure 5:
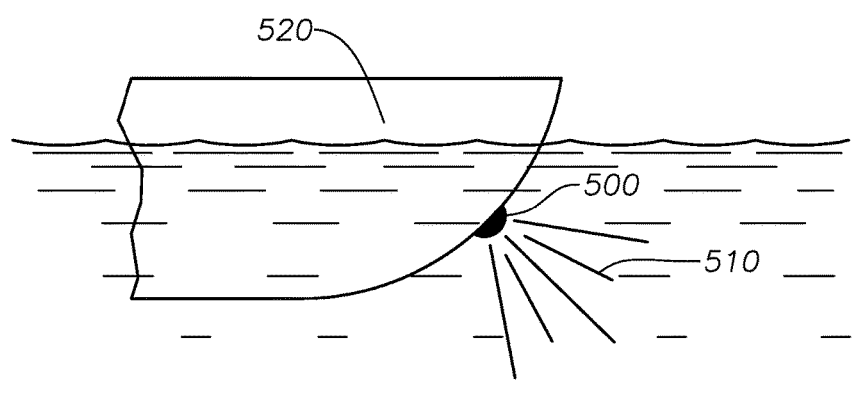
FIG. 5 illustrates a vessel having a sonar system in accordance with implementations of various techniques described herein.

FIG. 5 illustrates a sonar device 500. The sonar device 500 may contain at least one sonar transmitter element and at least one sonar receiver element. The sonar device 500 may contain at least one transducer. It should be understood by one of ordinary skill in the art that the transmitter element and receiver element may be contained within one sonar device 500, or may be placed in different locations. It should also be understood that the sonar device may be placed in any location on the vessel that will allow the device to remain submerged. The sonar device 500 may emit sonic frequencies 510, and receive reflected sonic frequencies 510. The sonar device may then transmit the reflected sonic frequencies in either an analog or digital format. The sonar device 500 may be disposed underneath a vessel 520. The sonar device 500 may be configured to acquire sonar data in the direction of travel of the vessel. Data transmitted from a sonar device 500 may be used by methods 200 and 300.

Marine Electronics Device

Figure 6:
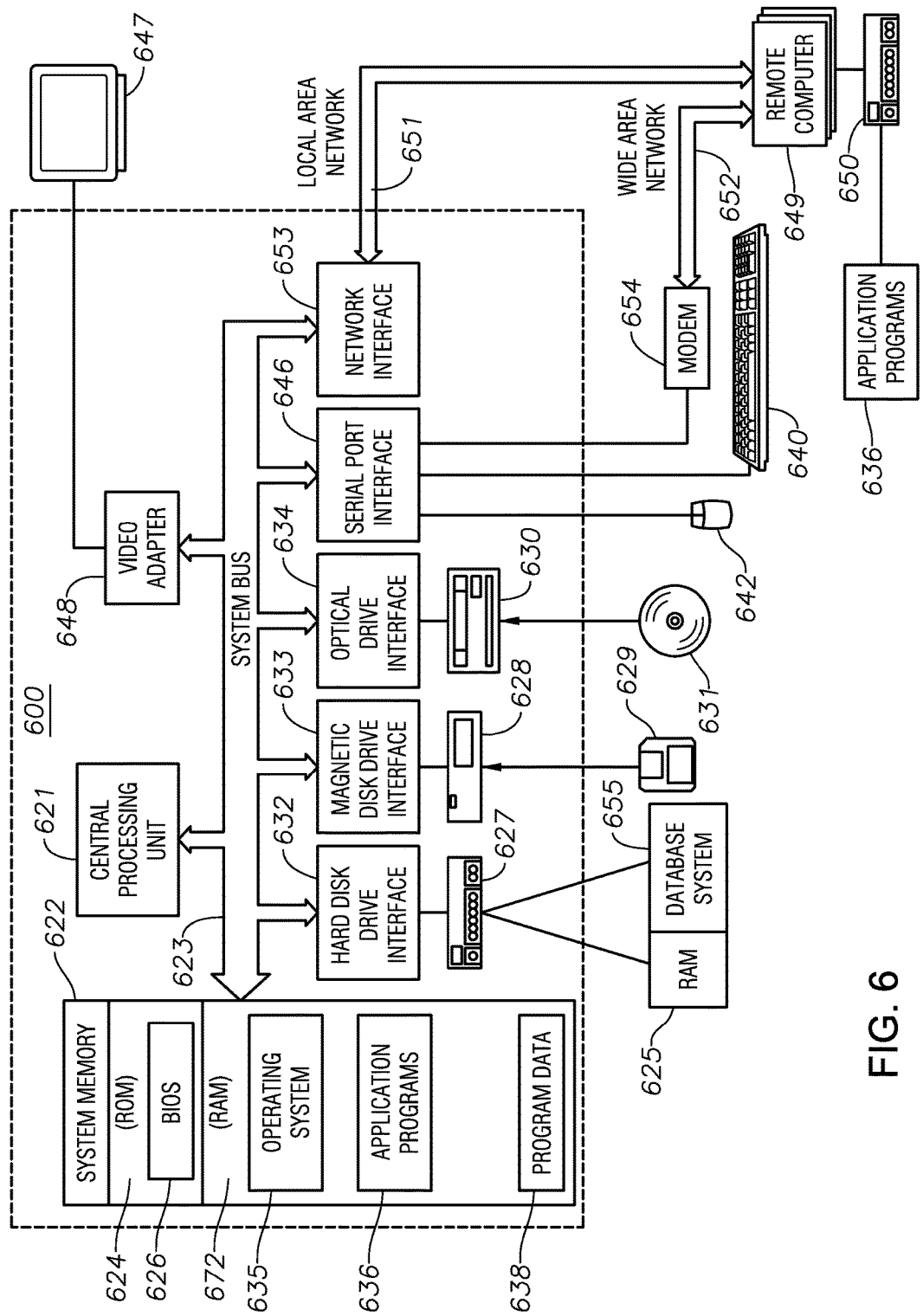
FIG. 6 illustrates a schematic diagram of a computing system in which the various technologies described herein may be incorporated and practiced.
Figure 7:
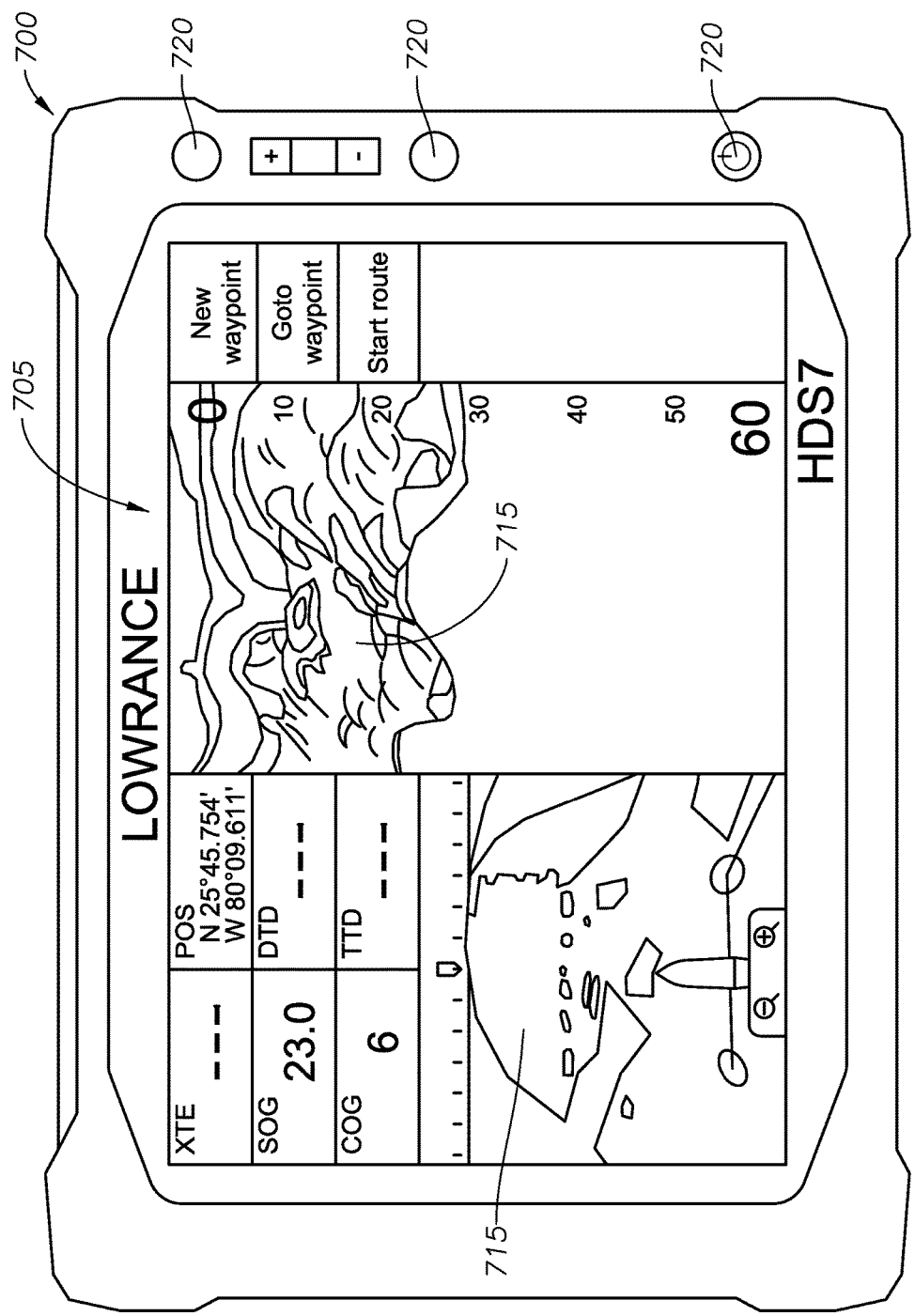
FIG. 7 illustrates a schematic of a marine electronics device in accordance with implementations of various techniques described herein.

FIG. 7 illustrates a schematic diagram of a marine electronics device 700 in accordance with various implementations described herein. The marine electronics device 700 includes a screen 705. In certain implementations, the screen 705 may be sensitive to touching by a finger. In other implementations, the screen 705 may be sensitive to the body heat from the finger, a stylus, or responsive to a mouse. The display device 700 may display marine electronic data 715. The marine electronic data types 715 may include chart data, radar data, sonar data, steering data, dashboard data, navigation data, forward looking sonar data, and the like. The marine electronics device 700 may display the depth information according to various implementations described herein. The marine electronics device 700 may also include a plurality of buttons 720, which may be either physical buttons or virtual buttons, or a combination thereof. The contents of the marine display device 700 are described in more detail with reference to FIG. 6.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

FIG. 6 illustrates a computer system 600 into which implementations of various technologies and techniques described herein may be implemented. Computing system 600 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 600 may include a central processing unit (CPU) 621, a system memory 622 and a system bus 623 that couples various system components including the system memory 622 to the CPU 621. Although only one CPU is illustrated in FIG. 6, it should be understood that in some implementations the computing system 600 may include more than one CPU. The system bus 623 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 622 may include a read only memory (ROM) 624 and a random access memory (RAM) 625. A basic input/output system (BIOS) 626, containing the basic routines that help transfer information between elements within the computing system 600, such as during start-up, may be stored in the ROM 624. The computing system may be implemented using a printed circuit board containing various components including processing units, data storage memory, and connectors.

The computing system 600 may further include a hard disk drive 627 for reading from and writing to a hard disk, a magnetic disk drive 628 for reading from and writing to a removable magnetic disk 629, and an optical disk drive 630 for reading from and writing to a removable optical disk 631, such as a CD ROM or other optical media. The hard disk drive 627, the magnetic disk drive 628, and the optical disk drive 630 may be connected to the system bus 623 by a hard disk drive interface 632, a magnetic disk drive interface 633, and an optical drive interface 634, respectively. The drives and their associated computer-readable media may provide nonvolatile storage of computer-readable instructions, data structures, program modules and other data for the computing system 600.

Although the computing system 600 is described herein as having a hard disk, a removable magnetic disk 629 and a removable optical disk 631, it should be appreciated by those skilled in the art that the computing system 600 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 627, magnetic disk 629, optical disk 631, ROM 624 or RAM 625, including an operating system 635, one or more application programs 636, program data 638, and a database system 655. The one or more application programs 636 may contain program instructions configured to perform methods 200 and 300 according to various implementations described herein. The operating system 635 may be any suitable operating system that may control the operation of a networked personal or server computer, such as Windows® XP, Mac OS® X, Unix-variants (e.g., Linux® and BSD®), and the like.

A user may enter commands and information into the computing system 600 through input devices such as a keyboard 640 and pointing device 642. Other input devices may include a microphone, joystick, game pad, satellite dish, scanner, user input button, or the like. These and other input devices may be connected to the CPU 621 through a serial port interface 646 coupled to system bus 623, but may be connected by other interfaces, such as a parallel port, game port or a universal serial bus (USB). A monitor 647 or other type of display device may also be connected to system bus 623 via an interface, such as a video adapter 648. In addition to the monitor 647, the computing system 600 may further include other peripheral output devices such as speakers and printers.

Further, the computing system 600 may operate in a networked environment using logical connections to one or more remote computers 649. The logical connections may be any connection that is commonplace in offices, enterprise-wide computer networks, intranets, and the Internet, such as local area network (LAN) 651 and a wide area network (WAN) 652. The remote computers 649 may each include application programs 636 similar to that as described above. The computing system 600 may use a Bluetooth radio to wirelessly communicate with another device.

When using a LAN networking environment, the computing system 600 may be connected to the local network 651 through a network interface or adapter 653. When used in a WAN networking environment, the computing system 600 may include a modem 654, wireless router or other means for establishing communication over a wide area network 652, such as the Internet. The modem 654, which may be internal or external, may be connected to the system bus 623 via the serial port interface 646. In a networked environment, program modules depicted relative to the computing system 600, or portions thereof, may be stored in a remote memory storage device 650. It will be appreciated that the network connections shown are exemplary and other means of establishing a communications link between the computers may be used.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon computer-executable instructions which, when executed by a computer, cause the computer to:

receive, from a forward looking sonar device, marine sonar data at a current location of a vessel, wherein the forward looking sonar device is disposed underneath the vessel and configured to acquire sonar data in the direction of travel of the vessel, wherein the marine sonar data is representative of a volume of an underwater environment ahead of the vessel in the direction of travel of the vessel;

determine a first location and a second location ahead of the current location of the vessel, wherein the first location and the second location are within the representative volume of the underwater environment, wherein the first location is between the sonar device and the second location;

analyze the marine sonar data received at the current location to determine a first depth at the first location ahead of the vessel in the direction of travel of the vessel;

analyze the marine sonar data received at the current location to determine a second depth at the second location ahead of the vessel in the direction of travel of the vessel;

determine the difference between the first depth and the second depth;

select the first depth of the first location or the second depth of the second location as corresponding to the second location based on the difference by:
  selecting the second depth of the second location as corresponding to the second location in an instance in which the difference is determined to exceed a threshold difference amount, or
  selecting the first depth of the first location as corresponding to the second location in an instance in which the difference is determined to be within the threshold difference amount; and display, on a chart or map on a screen of a marine electronics device of the vessel, a heading line that includes the determined first depth at the first location and the selected depth at the second location, wherein the heading line extends from the current location and ahead of a representation of the vessel in the direction of travel.

2. The non-transitory computer-readable medium of claim 1, wherein the computer-executable instructions further cause the computer to display the latitude and longitude coordinates for at least one of the first depth or the selected.

3. The non-transitory computer-readable medium of claim 1, wherein the computer-executable instructions further cause the computer to display the heading line on a navigation chart that includes a route where the heading line matches a portion of the route leading to a next waypoint along the route.

4. The non-transitory computer-readable medium of claim 1, wherein the computer-executable instructions further cause the computer to display the depths as numerical values.

* * * * *